(12) United States Patent
Liang et al.

(10) Patent No.: US 7,433,687 B2
(45) Date of Patent: Oct. 7, 2008

(54) METHOD AND DEVICE FOR MULTI-USER DETECTION WITH SIMPLIFIED DE-CORRELATION IN A CDMA SYSTEM

(75) Inventors: Jiangxin Liang, Shanghai (CN); Zhiyu Zhang, Shanghai (CN); Xiaojun Yin, Shanghai (CN)

(73) Assignee: NXP B.V., Eindhoven (NL)

( * ) Notice: Subject to any disclaimer, the term of this patent is extended or adjusted under 35 U.S.C. 154(b) by 186 days.

(21) Appl. No.: 10/540,692

(22) PCT Filed: Dec. 29, 2003

(86) PCT No.: PCT/IB03/06246

§ 371 (c)(1),
(2), (4) Date: Mar. 2, 2006

(87) PCT Pub. No.: WO2004/059863

PCT Pub. Date: Jul. 15, 2004

(65) Prior Publication Data

US 2006/0246837 A1 Nov. 2, 2006

(30) Foreign Application Priority Data

Dec. 30, 2002 (CN) .............................. 02 1 60465

(51) Int. Cl.
*H04Q 7/20* (2006.01)
(52) U.S. Cl. ............... 455/432.2; 455/20; 375/150; 370/342

(58) Field of Classification Search ................ 455/3.01, 455/132, 432.2, 20, 3.02, 424, 423, 436; 375/148, 130, 260, 137, 142, 150, 347; 370/329, 370/542, 342, 441, 18
See application file for complete search history.

(56) References Cited

U.S. PATENT DOCUMENTS

| | | | | |
|---|---|---|---|---|
| 5,638,376 | A | * | 6/1997 | Miki et al. ................ 370/342 |
| 6,081,566 | A | * | 6/2000 | Molnar et al. ............. 375/347 |
| 6,370,129 | B1 | * | 4/2002 | Huang ....................... 370/329 |
| 2003/0012263 | A1 | * | 1/2003 | Lu ............................. 375/148 |
| 2003/0096606 | A1 | * | 5/2003 | Inman et al. .............. 455/424 |
| 2006/0203895 | A1 | * | 9/2006 | Yue et al. .................. 375/150 |

FOREIGN PATENT DOCUMENTS

| | | | |
|---|---|---|---|
| DE | 0971485 A1 | * | 12/2000 |
| EP | 0 971 485 A1 | | 1/2000 |

OTHER PUBLICATIONS

"MMSE Detection of Multi-Carrier CDMA", by Scott Miller et al., Oct. 1999, pp. 1085-1089.
"Transform Domain Array Processing for CDMA Systems", by Yimin Zhang et al., Aug. 2000, pp. 23-27.

* cited by examiner

*Primary Examiner*—Tan Trinh

(57) ABSTRACT

A simplified de-correlation method in CDMA multi-user detection comprises: a. receive wireless symbols S; b. obtain a channel correlation matrix R, take a part from R to get a partial correlation matrix $R_P$; c. do inversion operation to the partial correlation matrix $R_P$, then obtain matrix $V^{(m)}$; d. recover original data symbols D from received symbols S by $V^{(m)}$ that the location of original data symbols D corresponds to.

10 Claims, 1 Drawing Sheet

Figure 1:
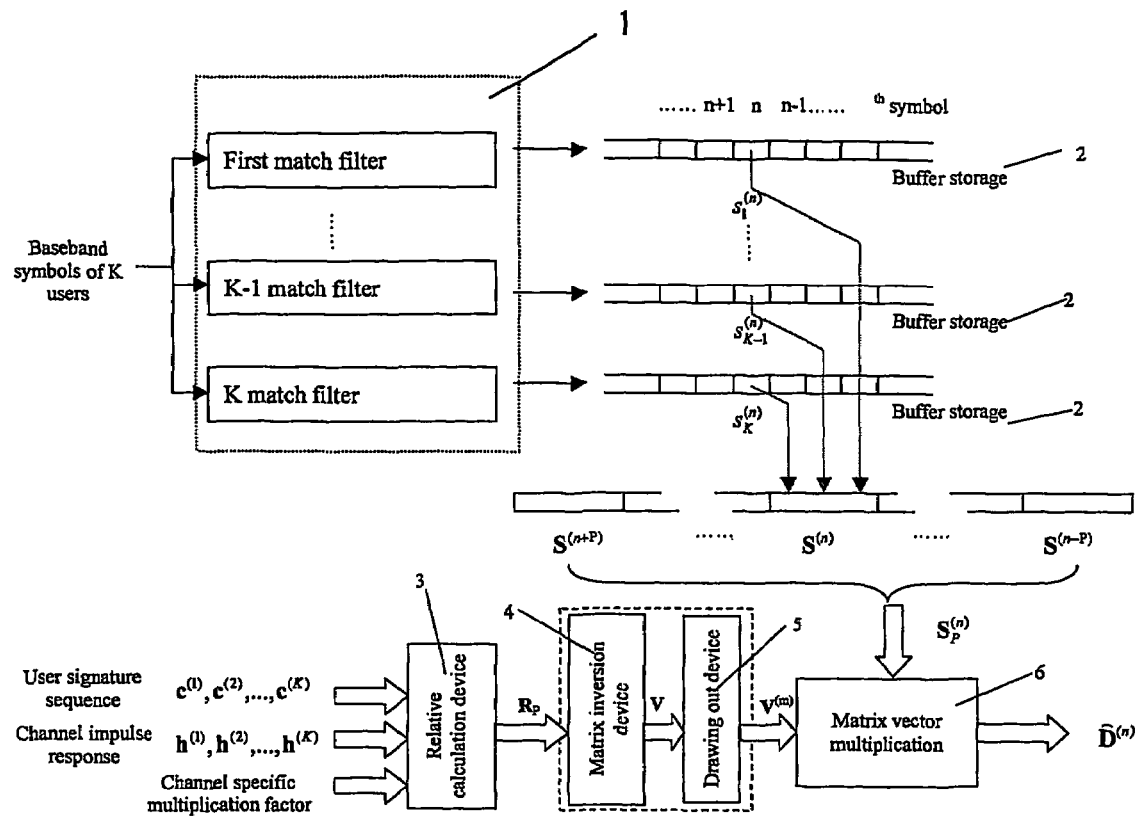

METHOD AND DEVICE FOR MULTI-USER DETECTION WITH SIMPLIFIED DE-CORRELATION IN A CDMA SYSTEM

FIELD OF THE INVENTION

The invention relates to a de-correlation method and relative device in CDMA, especially relates to a simplified de-correlation method and relevant device in TD-SCDMA multi-user detection.

BACKGROUND OF THE INVENTION

Under the collective influence of channel multi-path dispersion, Inter-Symbol Interference and Multiple Access Interference, it becomes a key of that the multi-user detection is practical or not, that how to depress the complexity of the multi-user detection cancellation algorithm, namely the de-correlation method, to acceptable degree. A received symbol vector can be expressed as the sum of a noise vector and the product that a transmitted symbol vector D left multiply by a channel correlation matrix R. Among the algorithm of demodulating the received symbol vector and getting the estimation $\hat{D}$ of the transmitted symbol, the most complex step is getting the inverse matrix $R^{-1}$ of the channel correlation matrix R. For example, usually existing technology adopts the following method: in downlink spreading factor is SF=16. Assuming there are K users in one time slot and $1 \leq K \leq 16$, in each of the data part, there are K*N data symbols altogether, each user has N=22 data symbols. Let the $n^{th}$ transmitted data symbols of all the K users be $$D^{(n)} = (d_1^{(n)}, d_2^{(n)}, d_3^{(n)}, \ldots d_k^{(n)}), n=1, \ldots, K \quad (1)$$

The symbol sequence of each user consists of N elements with intervals Ts. The elements are taken from a complex alphabet (1,j,−1,−j). Each data symbols of user K is multiplied by the user specific signature sequence. The specific signature sequence is expressed as:

$$C^{(k)} = (c_1^{(k)}, c_2^{(k)}, \ldots, c_Q^{(k)})^T, k=1, \ldots, K \quad (2)$$

Here $[\cdot]^T$ means vector/matrix transposition. The user specific signature sequence consists of Q chips at chip interval Tc that is equal to Ts/Q. Each of the K channels is characterized by its discrete impulse response. The discrete impulse response of the $k^{th}$ channel is expressed as:

$$H^{(k)} = (h_1^{(k)}, h_2^{(k)}, \ldots, h_W^{(k)})^T, k=1, \ldots, K \quad (3)$$

The discrete impulse response consists of W samples at chip rate interval Tc. The channel impulse response is assumed to be unchanged during one time slot.

It is very obviously that ISI arises when W>1, at one time, MAI arises due to channel distortion and non-orthogonal symbol $C^{(k)}$. The combined channel impulse response is defined by the convolution:

$$B^{(k)} = (b_1^{(k)}, b_2^{(k)}, \ldots, b_{Q+W-1}^{(k)})^T = C^{(k)} * H^{(k)}, \\ k=1, \ldots, K \quad (4)$$

The received sequence e is obtained at the chip rate. It is a sum of K sequences, each of length (N·Q+W−1), that are assumed to be arrive synchronously, perturbed by an noise sequence with same length:

$$n = (n_1, n_2, \ldots, n_{N \cdot Q+W-1})^T \quad (5)$$

The received sequence can be written as $$e = (e_1, e_2, \ldots e_{N \cdot Q+W-1})^T = A \cdot D + n \quad (6)$$

With transmitted data vector $$D = (D^{(1)}, D^{(2)}, \ldots, D^{(N)})^T = \\ \{d_1^{(1)}, d_2^{(1)}, \ldots d_K^{(1)}, \ldots d_1^{(n)}, \\ d_2^{(n)}, \ldots, d_K^{(n)}, \ldots d_1^{(N)}, \\ d_2^{(N)}, \ldots, d_K^{(N)}\}^T = (d_1, d_2, \ldots, d_{KN})^T \quad (7)$$

Where $d_1^{(n)}, d_2^{(n)}, \ldots d_k^{(n)}$ is the $n^{th}$ symbol of all the K users, and $$d_j^{def} = d_k^{(n)}; j=k+K \cdot (n-1), k=1, \ldots K, n=1 \ldots N \quad (8)$$

With the matrix $$A = (a_{ij}); i = 1 \ldots (N \cdot Q + W - 1), j = 1 \ldots K \cdot N \quad (9)$$

$$a_{Q(n-1)+1, k+K(n-1)} = \begin{cases} B_l^{(k)}, & \text{when} \begin{cases} n = 1 \ldots N, k = 1 \ldots K \\ l = 1 \ldots (Q + W - 1) \end{cases} \\ 0, & \text{other} \end{cases}$$

The received sequence e has to be processed to obtain a decision on the transmitted data symbol D under the assumption that the user-specific signature sequences $C^{(k)}$ and the channel cross-correlation $H^{(k)}$, k=1 ... K are known at receivers.

At the same time zero-forcing method is used to eliminate MAI and ISI. It is based on minimizing $$\|A\hat{D} - e\|^2 \quad (10)$$

Here $\hat{D}$ is the estimation of transmitted symbols of all the K users. So $$\hat{D} = (A^H A)^{-1} A^H e = D + (A^H A)^{-1} A^H n \quad (11)$$

Here $[\cdot]^H$ means Hermit transposition and $A^H e$ is the output of match filter, $(A^H A)^{-1} A^H n$ is noise term. Above $\hat{D}$ contains desired output D and noise, without MAT and ISI. Its covariance matrix $\delta^2 (A^H A)^{-1}$ gives the correlation of the noise term. Generally, the variance of the noise term is more than the noise term which is obtained because of using match filter method. The SNR per-symbol at the output of the de-correlation is equal to $$\gamma(k, n) = 1/\delta^2 [(A^H A)^{-1}]_{i,j}; j=n+N \cdot (k-1), k=1 \ldots K, \\ n=1 \ldots N \quad (12)$$

Let $$R = A^H A \quad (13)$$

Then (Eq. 11) becomes $$\hat{D} = (R)^{-1} (RD + A^H n) = D + (R)^{-1} A^H n \quad (14)$$

Because the difficulty exists in the matrix inversion operation of R, the calculation burden in TD-SCDMA system is bigger.

SUMMARY OF THE INVENTION

The invention wants to resolve the technical problem that provides a simplified de-correlation method to greatly reduce the complexity degree in multi-user detection calculation.

For resolving above problem, the invention adopts following technical project:

Provided de-correlation contains following steps:

a: Receive wireless symbols S;

b: Obtain a channel correlation matrix R, take one part from R and get a partial correlation matrix $R_P$;

c: Do inversion operation of the partial correlation matrix $R_P$ to obtain matrix $V^{(m)}$;

d: Recover transmitted data symbols D respectively from received symbols S according to $V^{(m)}$ that the corresponding location of the transmitted data symbols D corresponds to.

The advice according to above method includes relative calculation advice to define the partial correlation matrix $R_P$;

matrix inversion device and drawing out device to define new matrix $V^{(m)}$;

matrix-vector multiplication to multiply received wireless symbols S by said matrix $V^{(m)}$, which are connect each with other in turn.

Based on the character of channel correlation matrix, the invention has de-modulated only according to the inverse matrix of the diagonal partial matrix $R_p$ of the correlation matrix R so as to reduce greatly the calculation in obtaining inverse matrix and reduce the loss of de-modulate performance. Assuming p=2, the most delay-time is 4 chips, multi-path is 4, when total users are 12, the performance is same as the un-simplified. Because the calculation complexity of the matrix with size M*M is directly proportional to the $M^3$, so when P=22, N=22, the simplified inversion has only $(5/22)^3$ times calculation complexity of the original un-simplified matrix inversion. This is quite a great reduction. Equally, in the symbol recover calculation, the complexity is also reduced to (5/22) of the original operation.

BRIEF DESCRIPTION OF THE DRAWING FIGURES

FIG. 1. is adopted advice according to the simplified de-correlation method of the invention.

DETAILED DESCRIPTION OF THE INVENTION

Original transmitted data symbol can be expressed as
$D=[\ldots d_1^{(n-p)}, d_2^{(n-p)}, \ldots, d_k^{(n-p)}, \ldots, d_1^{(n)}, d_2^{(n)} \ldots, d_k^{(n)} \ldots, d_1^{(n+p)}, d_2^{(n+p)}, \ldots, d_k(n+p) \ldots]$ Above $d_1^{(n-p)}, d_2^{(n-p)}, \ldots, d_k^{(n-p)}$ means $(n-p)^{th}$ symbol of all K users. Above $d_1^{(n)}, d_2^{(n)} \ldots, d_k^{(n)}$ means $n^{th}$ symbol of all K users. Above $d_1^{(n+p)}, d_2^{(n+p)}, \ldots, d_k^{(n+p)}$ means $(n+p)^{th}$ symbol of all K users.

Received symbol S can be expressed as
$S=[\ldots \hat{s}_1^{(n-p)}, \hat{s}_2^{(n-p)}, \ldots, \hat{s}_k^{n-p)}, \ldots, \hat{s}_1^{(n)}, \hat{s}_2^{(n)} \ldots, \hat{s}_k^{(n)}, \ldots, \hat{s}_1^{(n+p)}, \hat{s}_k^{(n+p)} \ldots]$. Above $\hat{s}_1^{(n-p)}, \hat{s}_2^{(n-p)}, \ldots, \hat{s}_k^{(n-p)}$ means $(n-p)^{th}$ symbol of all K users. Above $\hat{s}_1^{(n)}, \hat{s}_2^{(n)} \ldots, \hat{s}_k^{(n)}$ means $n^{th}$ symbol of all K users. Above $\hat{s}_1^{(n+p)}, \hat{s}_2^{(n+p)}, \ldots, \hat{s}_k^{(n+p)}$ means $(n+P)^{th}$ symbol of all K users. Let us define $\hat{s}_1^{(n)}, \hat{s}_2^{(n)} \ldots, \hat{s}_k^{(n)}$ as $S^{(n)}$. Since the multi-path spread in TD-SCDMA is assumed to be less than 12 chips, and the spreading factor for downlink is 16, so there are no ISI from symbols more than 2 symbols away. Also the MAI and ISI part from any particular other user symbol is always much less than desired user symbol amplitude. To recover $D^{(n)}=d_1^{(n)}, d_2^{(n)} \ldots, d_k^{(n)}$, influence from symbols in $S^{(t)}$ (t<n−p, or t>n+p) can be neglected. It means $D^{(n)}$ can be recovered from received symbols
$S_p^{(n)}=[\hat{s}_1^{(n-p)}, \hat{s}_2^{(n-p)}, \ldots, \hat{s}_k^{(n-p)}, \ldots, \hat{s}_1^{(n)}, \hat{s}_2^{(n)} \ldots, \hat{s}_k^{(n)} \ldots, \hat{s}_1^{(n+p)}, {}_k^{(n+p)}]$. Above $\hat{s}_1^{(n-p)}, \hat{s}_2^{(n-p)}, \ldots, \hat{s}_k^{(n-p)}$ means $(n-p)^{th}$ symbol of all K users. Above $\hat{s}_1^{(n)}, \hat{s}_2^{(n)} \ldots, \hat{s}_k^{(n)}$ means $n^{th}$ symbol of all K users. Above $\hat{s}_1^{(n+p)}, \hat{s}_2^{(n+p)}, \ldots, \hat{s}_k^{(n+p)}$ means $(n+p)^{th}$ symbol of all K users.

Assume P is large enough.

We here define a partial correlation matrix
$R_p=\{r_{i,j}\}, i,j=1 \ldots (2P+1)K$ Here $r_{i,j}$ is the element of R in the $i^{th}$ row and $j^{th}$ column.
Define a new matrix $V^{(m)}=\{v_{i,j}^{(m)}\}$ $v_{i,j}^{(m)}=(R^{-1}_p)_{i+(m-1)K,j}$, i=1 \ldots K, j=1 \ldots (2P+1)K, m=1 \ldots 2P+1$ Here $R^{-1}_p$ means matrix inversion. When $P+1 \leq n \leq N-P$, $D^{(n)}$ can be recovered as $\hat{D}^{(n)}=V^{(P+1)}S_p^{(n)}$.

$\hat{D}^{(n)}$ is the estimation of transmitted symbol. When $n \leq P$, i.e. the interference symbol before $D^{(n)}$ is less than P, $D^{(n)}$ can be recovered as
$\hat{D}^{(n)}=V^{(n)}S_p^{(n)}$.

Here $S_p^{(n)}$ is defined as
$S_p^{(n)}=[\hat{s}_1^{(1)}, \hat{s}_2^{(1)}, \ldots, \hat{s}_K^{(1)}, \ldots, \hat{s}_1^{(n)}, \hat{s}_2^{(n)} \ldots, \hat{s}_K^{(n)} \ldots, \hat{s}_1^{(2P+1)}, \hat{s}_K^{(2P+1)}]$.

Above $\hat{s}_1^{(1)}, \hat{s}_2^{(1)}, \ldots, \hat{s}_K^{(1)}$ is first symbol of all K users. Above $\hat{s}_1^{(n)}, \hat{s}_2^{(n)} \ldots, \hat{s}_K^{(n)}$ is $n^{th}$ symbol of all K users. Above $\hat{s}_1^{(2P+1)}, \hat{s}_2^{(2P+1)}, \ldots, \hat{s}_K^{(2P+1)}$ is $2P+1^{th}$ symbol of all K users.

When $n \geq N+1-P$, and the interference symbols after $D^{(n)}$ is less P, $D^{(n)}$ can be recovered as
$\hat{D}^{(n)}=V^{(2P+1+n-N)}S_p^{(n)}$.

Here $S_p^{(n)}$ is defined as
$S_p^{(n)}=[\hat{s}_1^{(N-2P)}, \hat{s}_2^{(N-2P)}, \ldots, \hat{s}_K^{(N-2P)}, \ldots, \hat{s}_1^{(n)}, \hat{s}_2^{(n)} \ldots, \hat{s}_K^{(n)} \ldots, \hat{s}_1^{(N)}, \hat{s}_2^{(N)}, \ldots, \hat{s}_K^{(N)}]$.

Above $\hat{s}_1^{(N-2P)}, \hat{s}_2^{(N-2P)}, \ldots, \hat{s}_K^{(N-2P)}$ is $N-2P^{th}$ symbol of all K users. Above $\hat{s}_1^{(n)}, \hat{s}_2^{(n)} \ldots, \hat{s}_K^{(n)}$ is $n^{th}$ symbol of all K users. Above $\hat{s}_1^{(N)}, \hat{s}_2^{(N)}, \ldots, \hat{s}_K^{(N)}]$, is $N^{th}$ symbol of all K users.

In addition, the simplified de-correlation method can be named as partial de-correlation whose meaning is that use de-correlation method to eliminate the influence of the symbols which are earlier or later than the current on current symbols only according to P group of symbols which are earlier or later than current symbols.

FIG. 1 is the structure sketch map of the adopted advice according to the simplified de-correlation method.

It includes K match filters 1, K buffer storage 2 which are correspondingly connected with K match filters, relative calculation device 3 to define partial correlation matrix $R_p$, matrix inversion device 4 and drawing out device 5 which tag after the relative calculation device to define new matrix $V^{(m)}$. The output of the mentioned buffer storage 2 and the output of the drawing out device 3 are connected with the input of the matrix-vector multiplication 6.

The mentioned baseband symbols of K users respectively are inputted to K match filters 1 and K buffer storage 2 to get received symbol $S_p^n$. 1 and 2 are connected with each other correspondingly. The mentioned user signature sequence $C^{(k)}=(c_1^{(k)},c_2^{(k)}, \ldots C_Q^{(k)})^T$, channel impulse response $H^{(1)}$, $H^{(2)}, \ldots, H^{(k)}$, channel specific multiplication factor is respectively inputted to the relative calculation device 3 to obtain partial correlation matrix, then obtain the inverse matrix V of matrix $R_p$ through matrix inversion device 4 and drawing out device 5, and draw out partial matrix $V^{(m)}$ from it. Through matrix vector multiplication 6 symbol estimation value $\hat{D}^{(n)}$ can be obtained from mentioned received symbol $S_p^{(n)}$ and $V^{(m)}$.

The present invention is not restricted to above advice and method, so all the technical changes known by ordinary technician of the present fields should fall into the protective scope of the present invention.

What is claimed is:

1. A simplified de-correlation method in TD-SCDMA multi-user detection comprising:

receiving wireless symbols S;

obtaining a channel correlation matrix R, taking one part from the channel correlation matrix R and getting a partial correlation matrix $R_P$ of the channel correlation matrix R;

performing an inversion operation to the partial correlation matrix $R_P$, and then obtaining a matrix $V^{(m)}$ using an inverse version of the partial correlation matrix $R_P$; and recovering original data symbols D from the received symbols S using the matrix $V^{(m)}$.

2. A simplified de-correlation method in TD-SCDMA multi-user detection of claim 1, wherein said partial correlation matrix $R_P = \{r_{i,j}\}$, $i,j=1 \ldots (2P+1)K$, where said partial correlation matrix $R_P$ is a submatrix of the channel correlation matrix R on diagonal, said K is the user number in one time slot, and said P is the symbols number earlier than or latter than current symbols and have influence to current symbols.

3. A simplified de-correlation method in TD-SCDMA multi-user detection of claim 2, wherein said $V^{(m)} = \{v_{i,j}^{(m)}\}$, where $v_{i,j}^{(m)} = (R_P^{-1})_{i+(m-1)K,j}$, $i=1\ldots K, j=1\ldots (2P+1)K, m=1\ldots 2P+1$.

4. A simplified de-correlation method in TD-SCDMA multi-user detection of claim 2, wherein $1 \leq K \leq 16$.

5. A simplified de-correlation method in TD-SCDMA multi-user detection of claim 1, wherein the location of original data symbols D have three situations:
  1) when $1 \leq n \leq P$, $V^{(m)} = V^{(n)}$, $D^{(n)}$ can be recovered as $\hat{D}^{(n)} = V^{(n)} S_P^{(n)}$
  2) when $P+1 \leq n \leq N-P$, $V^{(m)} = V^{(P+1)}$, $D^{(n)}$ can be recovered as $\hat{D}^{(n)} = V^{(P+1)} S_P^{(n)}$
  3) when $N+1-P \leq n \leq N$, $V^{(m)} = V^{(2P+1+n-N)}$, $D^{(n)}$ can be recovered as $\hat{D}^{(n)} = V^{(2P+1+n-N)} S_P^{(n)}$, said $\hat{D}^{(n)}$ is the estimation of original symbol, said n is location of chip.

6. A simplified de-correlation method in TD-SCDMA multi-user detection of claim 5, wherein said P is an integer and said N is 22.

7. A simplified de-correlation method in TD-SCDMA multi-user detection of claim 6, wherein said P is 2.

8. A simplified de-correlation method in TD-SCDMA multi-user detection of claim 1, wherein:

When $P+1 \leq n \leq N-P$, received wireless symbols S can be defined as $$S_P^{(n)} = \left( \underbrace{\hat{s}_1^{(n-P)}, \hat{s}_2^{(n-P)}, \ldots, \hat{s}_K^{(n-P)}}_{n-P^{th}\ symbols\ of\ all\ K\ users}, \ldots, \underbrace{\hat{s}_1^{(n)}, \hat{s}_2^{(n)}, \ldots, \hat{s}_K^{(n)}}_{n^{th}\ symbols\ of\ all\ K\ users}, \ldots, \underbrace{\hat{s}_1^{(n+P)}, \hat{s}_2^{(n+P)}, \ldots, \hat{s}_K^{(n+P)}}_{n+P^{th}\ symbols\ of\ all\ K\ users} \right)$$

where said $\hat{S}_1^{(n-P)}, \hat{S}_2^{(n-P)}, \ldots, \hat{S}_K^{(n-P)}$ is $(n-P)^{th}$ symbols of all K users, said $\hat{S}_1^{(n)}, \hat{S}_2^{(n)}, \ldots, \hat{S}_K^{(n)}$ is $(n)^{th}$ symbols of all K users, said $\hat{S}_1^{(n+P)}, \hat{S}_2^{(n+P)}, \ldots, \hat{S}_K^{(n+P)}$ is $(n+P)^{th}$ symbols of all K users;

When $1 \leq n \leq P$, received wireless symbols S can be defined as $$S_P^{(n)} = \left( \underbrace{\hat{s}_1^{(1)}, \hat{s}_2^{(1)}, \ldots, \hat{s}_K^{(1)}}_{1^{st}\ symbols\ of\ all\ K\ users}, \ldots, \underbrace{\hat{s}_1^{(n)}, \hat{s}_2^{(n)}, \ldots, \hat{s}_K^{(n)}}_{n^{th}\ symbols\ of\ all\ K\ users}, \ldots, \underbrace{\hat{s}_1^{(2P+1)}, \hat{s}_2^{(2P+1)}, \ldots, \hat{s}_K^{(2P+1)}}_{2P+1^{th}\ symbols\ of\ all\ K\ users} \right)$$

where said $\hat{S}_1^{(1)}, \hat{S}_2^{(1)}, \ldots, \hat{S}_K^{(1)}$ is $1^{th}$ symbols of all K users, said $\hat{S}_1^{(n)}, \hat{S}_2^{(n)}, \ldots, \hat{S}_K^{(n)}$ is $(n)^{th}$ symbols of all K users, said $\hat{S}_1^{(2P+1)}, \hat{S}_2^{(2P+1)}, \ldots, \hat{S}_K^{(2P+1)}$ is $2P+1^{th}$ symbols of all K users;

When $N+1-P \leq n \leq N$, received wireless symbols S can be defined as $$S_P^{(n)} = \left( \underbrace{\hat{s}_1^{(N-2P)}, \hat{s}_2^{(N-2P)}, \ldots, \hat{s}_K^{(N-2P)}}_{N-2P^{th}\ symbols\ of\ all\ K\ users}, \ldots, \underbrace{\hat{s}_1^{(n)}, \hat{s}_2^{(n)}, \ldots, \hat{s}_K^{(n)}}_{n^{th}\ symbols\ of\ all\ K\ users}, \ldots, \underbrace{\hat{s}_1^{(N)}, \hat{s}_2^{(N)}, \ldots, \hat{s}_K^{(N)}}_{N^{th}\ symbols\ of\ all\ K\ users} \right)$$

where said $\hat{S}_1^{(N-2P)}, \hat{S}_2^{(N-2P)}, \ldots, \hat{S}_K^{(N-2P)}$ is $N-2P^{th}$ symbols of all K users, said $\hat{S}_1^{(n)}, \hat{S}_2^{(n)}, \ldots, \hat{S}_K^{(n)}$ is $n^{th}$ symbols of all K users, said $\hat{S}_1^{(N)}, \hat{S}_2^{(N)}, \ldots, \hat{S}_K^{(N)}$ is $N^{th}$ symbols of all K users.

9. A UE system in TD-SCDMA comprising:
  a correspond calculate equipment to define a partial correlation matrix $R_P$ of a channel correlation matrix R;
  a draw out and inversed matrix equipment to define new matrix $V^{(m)}$ using the partial correlation matrix $R_P$; and
  a matrix-vector multiplication to multiply received wireless symbols S by said matrix $V^{(m)}$.

10. A UE system in TD-SCDMA of claim 9 further comprising K matching filters and K buffer storages that are connected to said K matching filters one by one.

* * * * *